United States Patent
Morita et al.

(10) Patent No.: US 12,459,570 B2
(45) Date of Patent: Nov. 4, 2025

(54) DRIVING ASSISTANCE DEVICE

(71) Applicants: DENSO CORPORATION, Kariya (JP); TOYOTA JIDOSHA KABUSHIKI KAISHA, Toyota (JP)

(72) Inventors: Karin Morita, Kariya (JP); Sho Hashimoto, Toyota (JP); Yumi Shimanaka, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 18/173,474

(22) Filed: Feb. 23, 2023

(65) Prior Publication Data

US 2023/0192192 A1 Jun. 22, 2023

Related U.S. Application Data

(63) Continuation of application No. PCT/JP2021/030029, filed on Aug. 17, 2021.

(30) Foreign Application Priority Data

Aug. 25, 2020 (JP) ................. 2020-141756

(51) Int. Cl.
*B62D 15/02* (2006.01)
*B60W 10/18* (2012.01)
(Continued)

(52) U.S. Cl.
CPC ......... *B62D 15/0265* (2013.01); *B60W 30/09* (2013.01); *B60W 50/12* (2013.01);
(Continued)

(58) Field of Classification Search
CPC ... B62D 15/0265; B60W 30/09; B60W 50/12; B60W 2554/4044; B60W 10/18; B60W 10/12
(Continued)

(56) References Cited

U.S. PATENT DOCUMENTS 6,129,025 A * 10/2000 Minakami ............... B60L 13/03
  104/88.01
6,405,132 B1 * 6/2002 Breed ..................... G08G 1/161
  701/45

(Continued)

FOREIGN PATENT DOCUMENTS

JP 2017-043262 A 3/2017
JP 2019-064336 A 4/2019
(Continued)

OTHER PUBLICATIONS

Liu, Liang-Chien, Chiung-Yao Fang, and Sei-Wang Chen. "A novel distance estimation method leading a forward collision avoidance assist system for vehicles on highways." IEEE Transactions on Intelligent Transportation Systems 18.4 (2016): 937-949. (Year: 2016).*

(Continued)

*Primary Examiner* — Ramya P Burgess
*Assistant Examiner* — Keith A von Volkenburg
(74) *Attorney, Agent, or Firm* — Maschoff Brennan

(57) ABSTRACT

A driving assistance device provides driving assistance for avoiding a collision between an own vehicle and an object around the own vehicle, based on detection information on the object. The driving assistance device includes: a primary target determination unit that, based on the detection information, determines an object to be a primary target of which a collision with the own vehicle is to be avoided; a secondary determination region setting unit that, based on the (Continued)

detection information, sets a secondary determination region in which to determine an object to be a secondary target of which a collision with the own vehicle is to be avoided on an avoidance steering route of the own vehicle for avoiding a collision with the primary target; a secondary target determination unit that, based on the detection information, determines an object to be the secondary target in the secondary determination region; and a steering assistance unit that provides steering assistance to the own vehicle. The steering assistance unit suppresses avoidance steering of the own vehicle if the primary target determination unit determines that the primary target exists and the secondary target determination unit determines that the secondary target exists.

4 Claims, 10 Drawing Sheets

(51) Int. Cl.
   *B60W 10/20* (2006.01)
   *B60W 30/09* (2012.01)
   *B60W 50/12* (2012.01)
(52) U.S. Cl.
   CPC ............ *B60W 10/18* (2013.01); *B60W 10/20* (2013.01); *B60W 2554/4044* (2020.02)
(58) Field of Classification Search
   USPC ........................................................ 701/301
   See application file for complete search history.

(56) References Cited

U.S. PATENT DOCUMENTS

| | | | |
|---|---|---|---|
| 10,372,130 | B1* | 8/2019 | Kaushansky ....... B60W 60/001 |
| 2004/0016870 | A1* | 1/2004 | Pawlicki ............. B62D 15/025 |
| | | | 315/77 |
| 2017/0057498 | A1 | 3/2017 | Katoh |
| 2019/0100197 | A1 | 4/2019 | Saiki |
| 2019/0329768 | A1* | 10/2019 | Shalev-Shwartz ....... G05D 1/65 |
| 2020/0064144 | A1* | 2/2020 | Tomita ..................... B62D 6/00 |
| 2020/0064863 | A1* | 2/2020 | Tomita ................... A01B 69/00 |
| 2020/0135037 | A1* | 4/2020 | Flotte .................... H04L 67/565 |
| 2020/0156662 | A1* | 5/2020 | Mimura ................. B60K 35/25 |
| 2020/0172122 | A1* | 6/2020 | Mimura ........... B60W 60/0055 |
| 2020/0172123 | A1* | 6/2020 | Kubota ............. B60W 60/0053 |
| 2020/0198628 | A1 | 6/2020 | Matsunaga et al. |
| 2020/0264301 | A1* | 8/2020 | Birkedahl ............. G01S 13/933 |
| 2021/0107471 | A1 | 4/2021 | Saiki |
| 2022/0048501 | A1 | 2/2022 | Saiki |

FOREIGN PATENT DOCUMENTS

| | | | |
|---|---|---|---|
| JP | 2020-100362 A | 7/2020 | |
| WO | WO-2018173674 A1 * | 9/2018 | ............. B60Q 9/008 |

OTHER PUBLICATIONS

Journal of Society of Automotive Engineers of Japan, JSAE, Auto Technology, Apr. 1, 2020, pp. 20-25.

* cited by examiner ical field

DRIVING ASSISTANCE DEVICE

CROSS-REFERENCE TO RELATED APPLICATION

This application is the U.S. bypass application of International Application No. PCT/JP2021/030029 filed on Aug. 17, 2021 which designated the U.S. and claims priority to Japanese Patent Application No. 2020-141756 filed on Aug. 25, 2020, the contents of both of which are incorporated herein by reference.

TECHNICAL FIELD

The present invention relates to a driving assistance device that executes a collision avoidance control of an own vehicle if it is determined that an object around the own vehicle may collide with the own vehicle.

BACKGROUND

There is known a driving assistance device that if it is determined that an object around the own vehicle may collide with the own vehicle, executes a collision avoidance control of the own vehicle to brake or steer the own vehicle. According to the technique disclosed in JP 2017-43262 A, if there is a high possibility of a collision between an object detected ahead and the own vehicle, the own vehicle is braked by automatic braking, and if there is still a high risk of a collision in spite of the braking, the own vehicle is automatically steered. Whether to execute automatic steering is determined based on a comparison between a predicted collision speed at a predicted collision position where the detected object and the own vehicle will collide and a predetermined threshold.

SUMMARY

The present disclosure provides a driving assistance device that provides driving assistance for avoiding a collision between an own vehicle and an object around the own vehicle, based on detection information on the object. The driving assistance device includes: a primary target determination unit that, based on the detection information determines an object to be a primary target of which a collision with the own vehicle is to be avoided; a secondary determination region setting unit that, based on the detection information, sets a secondary determination region in which a secondary target is to be avoided on an avoidance steering route of the own vehicle which is for avoiding the collision with the primary target; a secondary target determination unit that, based on the detection information, determines an object to be the secondary target in the secondary determination region; and a steering assistance unit that provides steering assistance to the own vehicle to avoid a collision between the own vehicle and the object. The steering assistance unit suppresses the avoidance steering of the own vehicle if the primary target determination unit determines that the primary target exists and the secondary target determination unit determines that the secondary target exists.

BRIEF DESCRIPTION OF THE DRAWINGS

The above features of the present disclosure will become apparent from the following detailed description with reference to the accompanying drawings. In the accompanying drawings.

DETAILED DESCRIPTION OF THE PREFERRED EMBODIMENTS

Figure 1:
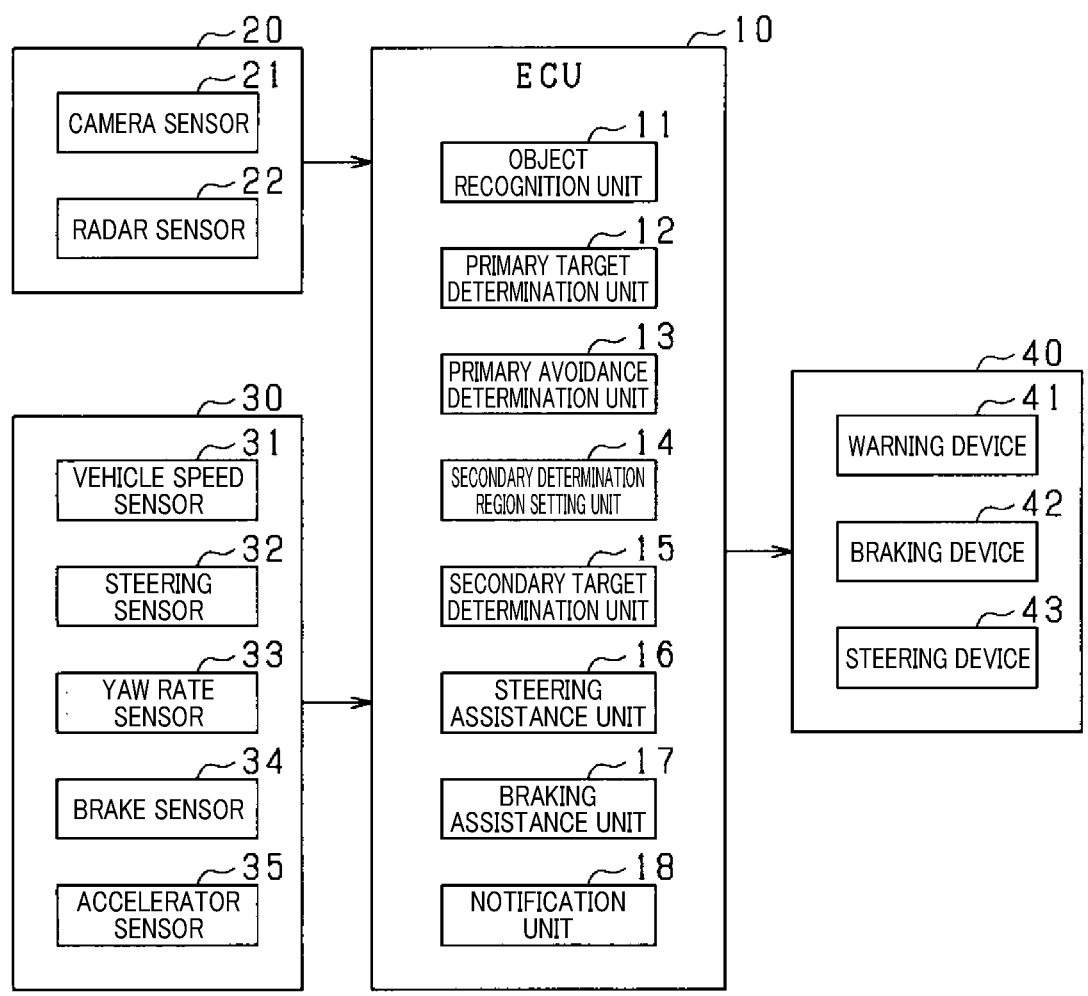
FIG. 1 is a diagram illustrating a driving assistance system including a driving assistance device according to a first embodiment.

According to JP 2017-43262 A, automatic braking or automatic steering is performed in consideration of only the avoidance of a collision with a primary target that is an object with a high possibility of a collision with the own vehicle, among objects around the own vehicle. However, executing automatic steering to avoid a collision with the primary target may increase the possibility of a collision with another object different from the primary target, which exists on an avoidance steering route taken by the automatic steering.

In view of the foregoing circumstances, an objective of the present disclosure is to provide a technique by which to suppress an increase in the possibility of a collision with an object that is different from a primary target and exists on the avoidance steering route, which may occur as a result of avoidance of a collision with the primary target by automatic steering.

The present disclosure provides a driving assistance device that provides driving assistance for avoiding a collision between an own vehicle and an object around the own vehicle, based on detection information on the object. The driving assistance device includes: a primary target determination unit that, based on the detection information determines an object to be a primary target of which a collision with the own vehicle is to be avoided; a secondary determination region setting unit that, based on the detection information, sets a secondary determination region in which a secondary target is to be avoided on an avoidance steering route of the own vehicle which is for avoiding the collision with the primary target; a secondary target determination unit that, based on the detection information, determines an object to be the secondary target in the secondary determination region; and a steering assistance unit that provides steering assistance to the own vehicle to avoid a collision between the own vehicle and the object. The steering assistance unit suppresses the avoidance steering of the own vehicle if the primary target determination unit determines that the primary target exists and the secondary target determination unit determines that the secondary target exists.

According to the present disclosure, if the primary target determination unit determines the primary target of which a collision with the own vehicle is to be avoided, the secondary determination region setting unit sets the secondary determination region for determining the secondary target of which a collision with the own vehicle is to be avoided on the avoidance steering route of the own vehicle for avoiding a collision with the primary target. Then, the secondary target determination unit determines the secondary target in the secondary determination region. Even though the primary target determination unit determines that the primary target exists, the steering assistance unit suppresses the avoidance steering of the own vehicle for avoiding a collision with the primary target if the secondary target determination unit determines that the secondary target exists. Therefore, it is possible to suppress an increase in the possibility of a collision with an object that is different from the primary target and exists on the avoidance steering route, which may occur as a result of avoidance of a collision with the primary target by the automatic steering of the steering assistance unit.

First Embodiment

FIG. 1 illustrates a driving assistance system according to the present embodiment. The driving assistance system is installed in a vehicle, and includes an ECU 10, an object detection device 20, a driving state sensor 30, and a controlled device 40.

The object detection device 20 includes a camera sensor 21 and a radar sensor 22. The camera sensor 21 and the radar sensor 22 are examples of an object detection sensor that detects objects around the own vehicle. The object detection device 20 may additionally include a sensor transmitting probe waves, such as an ultrasonic sensor or a light detection and ranging/laser imaging detection and ranging (LIDAR) sensor.

The camera sensor 21 may be a monocular camera such as a CCD camera, a CMOS image sensor, or a near-infrared camera, or may be a stereo camera, for example. One or more camera sensors 21 may be installed in the own vehicle. The camera sensor 21 is attached at a predetermined height in the center of the vehicle viewed in the vehicle width direction, and captures an image of a region extending ahead of the own vehicle from a bird's-view point in a predetermined angular range. The camera sensor 21 extracts feature points indicating the presence of an object in the captured image. Specifically, the camera sensor 21 extracts edge points based on brightness information of the captured image, and performs Hough transform on the extracted edge points. In the Hough transform, the camera sensor 21 extracts, as feature points, points on a straight line in which a plurality of edge points is consecutively aligned and points at which straight lines are orthogonal to each other. The camera sensor 21 sequentially outputs images captured in sequence as sensing information to the ECU 10.

The radar sensor 22 is a publicly known millimeter wave radar that transmits high-frequency signals in a millimeter waveband, for example. One or more radar sensors 22 may be installed in the own vehicle. The radar sensor 22 is provided at the front end of the own vehicle, for example, to detect the position of an object in a detection range where object detection is possible at a predetermined detection angle. Specifically, the radar sensor 22 transmits probe waves in predetermined cycles and receives reflection waves by a plurality of antennas. The distance to the object can be calculated by the transmission time of the probe wave and the reception time of the reflection wave. The radar sensor 22 also calculates the relative speed by a change in the frequency of the reflection wave from the object due to the Doppler effect. In addition, the radar sensor 22 can calculate the azimuth of the object using phase differences among the reflection waves received by the plurality of antennas. Once the position and azimuth of the object are calculated, it is possible to specify the position of the object relative to the own vehicle.

The sensor transmitting probe waves, such as a millimeter wave radar exemplified by the radar sensor 22, a sonar, or a LIDAR, sequentially outputs the results of scanning based on reception signals obtained upon reception of reflection waves from an obstacle, as sensing information, to the ECU 10.

The driving state sensor 30 includes a vehicle speed sensor 31, a steer sensor 32, a yaw rate sensor 33, a brake sensor 34, and an accelerator sensor 35. The driving state sensor 30 is a sensor group that is installed in the vehicle and can detect driving information indicated by various parameters of the driving state of the own vehicle (for example, vehicle speed, yaw rate, steering angle, and the like). The ECU 310 acquires the values of detection information using the driving state sensor 30.

The vehicle speed sensor 31 is provided at the rotation shaft that transfers motive power to the wheels of the own vehicle, and determines the speed of the own vehicle based on the rotation speed of the rotation shaft. The steer sensor 32 is provided in the steering wheel to detect the direction of the driver's steering operation and the amount of the steering operation. The yaw rate sensor 33 outputs a yaw rate signal according to the change rate of the steering amount of the own vehicle to the ECU 10.

The brake sensor 34 is provided in the brake pedal to detect the presence or absence of the driver's operation on the brake pedal and, if any, the amount of the operation. The accelerator sensor 35 is provided to the accelerator pedal to detect the presence or absence of the driver's operation on the accelerator pedal and, if any, the amount of the operation.

The controlled device 40 includes a warning device 41, a braking device 42, and a steering device 43. The warning device 41, the braking device 42, and the steering device 43 are driven in response to control commands from the ECU 10.

The warning device 41 includes a speaker and a display installed in the interior of the own vehicle, for example. The warning device 41 notifies the driver of a risk of a collision with an object by outputting a warning sound or a warning message in response to a control command from the ECU 10.

The braking device 42 is a braking device that brakes the own vehicle. In the present embodiment, as braking functions for avoiding a collision with an object or reducing the damage of a collision, the ECU 10 has a brake assistance function of increasing a braking force generated by the driver's braking operation to assist the driver in applying a brake, and has an automatic braking function of performing automatic braking if no braking operation is performed by the driver. The braking device 42 performs brake control by these functions in response to a control command from the ECU 10.

The steering device 43 is a device for steering the own vehicle, and is controlled by the driver's steering operation or a command from the ECU 10. The ECU 10 has a function of automatically controlling the steering device 43 for collision avoidance or lane change.

The controlled device 40 may include another device controlled by the ECU 10. For example, the controlled device 40 may include a safety device for securing the safety of the driver. A specific example of the safety device is a seat belt device including a pretensioner mechanism that draws in a seat belt provided at each seat of the own vehicle.

The ECU 10 includes an object recognition unit 11, a primary target determination unit 12, a primary avoidance determination unit 13, a secondary determination region setting unit 14, a secondary target determination unit 15, a steering assistance unit 16, a braking assistance unit 17, and a notification unit 18. The ECU 10 also includes a CPU, a ROM, a RAM, an I/O unit, and the like, and performs these functions by the CPU executing programs installed in the ROM. Accordingly, the ECU 10 functions as a driving assistance device that provides driving assistance to the own vehicle by generating and outputting control commands to the controlled device 40 based on the information acquired from the object detection device 20 and the driving state sensor 30.

The object recognition unit 11 acquires object detection information from the camera sensor 21 and the radar sensor 22, and uses the feature points obtained from the camera sensor 21 and the object position information obtained from the radar sensor 22 to recognize that an object exists at that position. The object recognition unit 11 also associates the position and speed of each object relative to the own vehicle, and calculates the lateral velocity of the object that is a relative velocity in a direction orthogonal to the traveling direction of the own vehicle and a longitudinal velocity that is a relative velocity in the traveling direction of the own vehicle, based on the associated relative position and relative speed. The object recognition unit 11 may be configured to recognize an object detected in a determination region set in a predetermined region around the own vehicle, as a target object with which a collision is to be avoided. The object recognition unit 11 is also capable of recognizing the positions and sizes of on-road structures and white lines.

The primary target determination unit 12 determines an object to be a primary target of which a collision with the own vehicle is to be avoided, from a plurality of pieces of detection information acquired by the object recognition unit 11. Specifically, the object recognition unit 11 detects one or more objects existing ahead of the own vehicle in the traveling direction, and specifies, among the detected objects, an object to be the primary target of which a collision with the own vehicle is to be avoided, under the conditions (1) that the existence probability of the object is high, (2) the object exists on the traveling route of the own vehicle, and (3) the time to collision (TTC), which is the time to a collision between the own vehicle and the object, is minimum. The objects existing on the traveling route of the own vehicle can be specified by using a known technique, based on high probability of existence in the driving lane in which the own vehicle is driving or the lateral position of the object, for example. Accordingly, when there is an object A closer to the own vehicle and an object B more distant from the own vehicle on the path of the own vehicle in the traveling direction, for example, the object B will be specified as an object to be the primary target if the time to collision with the object B is shorter than the time to collision with the object A. The primary target is an object that is a target of collision avoidance on the current driving route of the own vehicle. Examples of types of the target object include stationary objects such as vehicles, bicycles, pedestrians, and road cones, and moving bodies.

Figure 2:
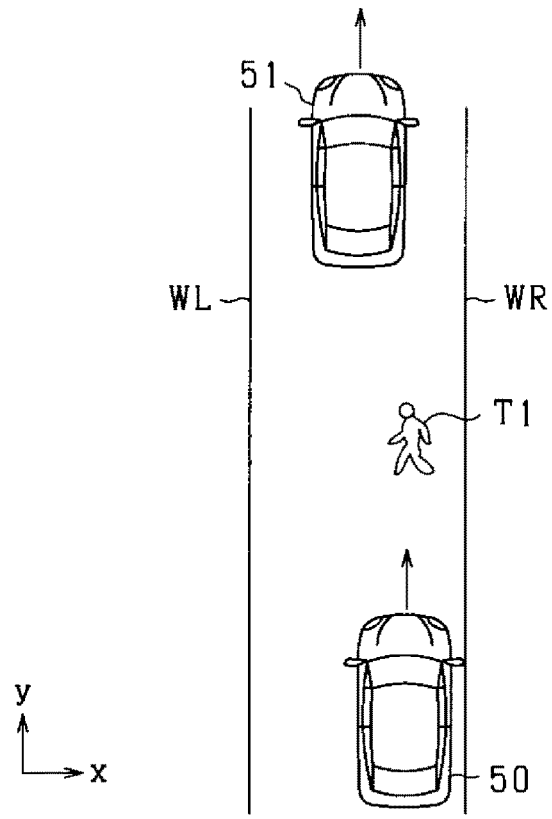
FIG. 2 is a diagram describing a primary target.

For example, as illustrated in FIG. 2, if an own vehicle 50 is driving in the positive y axis direction in a lane between a left white line WL and a right white line RW orthogonal to a y direction, a pedestrian (T1) existing at a position ahead of the own vehicle 50 (in the positive y axis direction) will collide with the own vehicle 50 if the own vehicle 50 goes straight ahead without changing the current driving route. The pedestrian is recognized as a primary target T1, and the primary target determination unit 12 determines that the primary target T1 exists.

The primary avoidance determination unit 13 determines whether to execute a control for avoiding a collision with the primary target or reducing the damage of a collision. Specifically, based on the relative distance between the own vehicle and the primary target, the primary avoidance determination unit 13 calculates the time to collision, which is the time to a collision between the own vehicle and the primary target. Then, the primary avoidance determination unit 13 determines whether to activate the controlled device 40 such as the warning device 41, the braking device 42, or the steering device 43 to avoid a collision, from the comparison between the time to collision and activation timing. The activation timing refers to the timing at which the warning device 41, the braking device 42, or the steering device 43 is to be activated, which may be set individually for each device to be activated.

Figure 3:
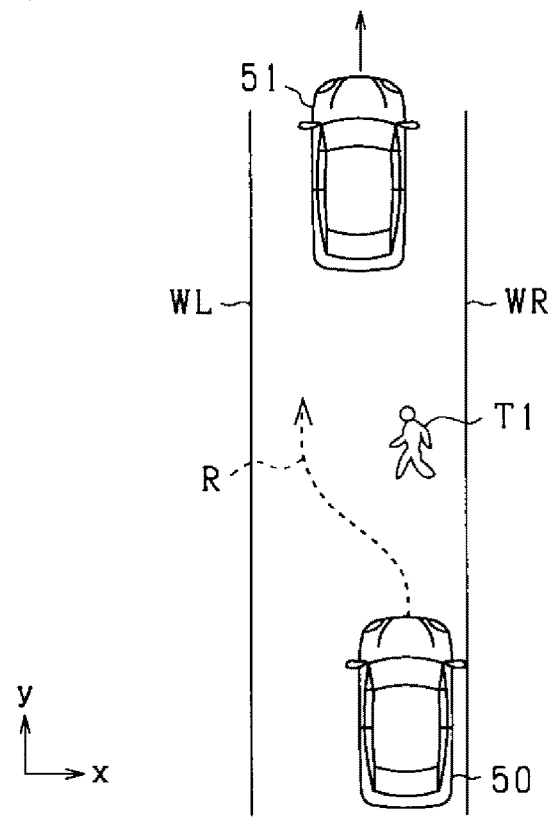
FIG. 3 is a diagram illustrating an avoidance steering route of an own vehicle for avoiding a collision with the primary target.

As illustrated in FIG. 3, if the primary target determination unit 12 determines that the primary target T1 exists, the primary avoidance determination unit 13 sets an avoidance steering route R of the own vehicle 50 for avoiding a collision with the primary target T1, prior to the execution of avoidance of a collision with the primary target T1. The avoidance steering route R is a future driving route that will be taken if the own vehicle 50 executes avoidance steering to the left. The avoidance steering route R is set within the driving lane between the left white line WL and the right white line WR.

The secondary determination region setting unit 14 sets the secondary determination region in which to determine an object to be a secondary target of which a collision with the own vehicle is to be avoided, on the avoidance steering route set by the primary avoidance determination unit 13. The secondary target is a target object with which a collision is to be avoided on the future driving route (the avoidance steering route) in the case where the own vehicle executes avoidance steering.

Figure 4:
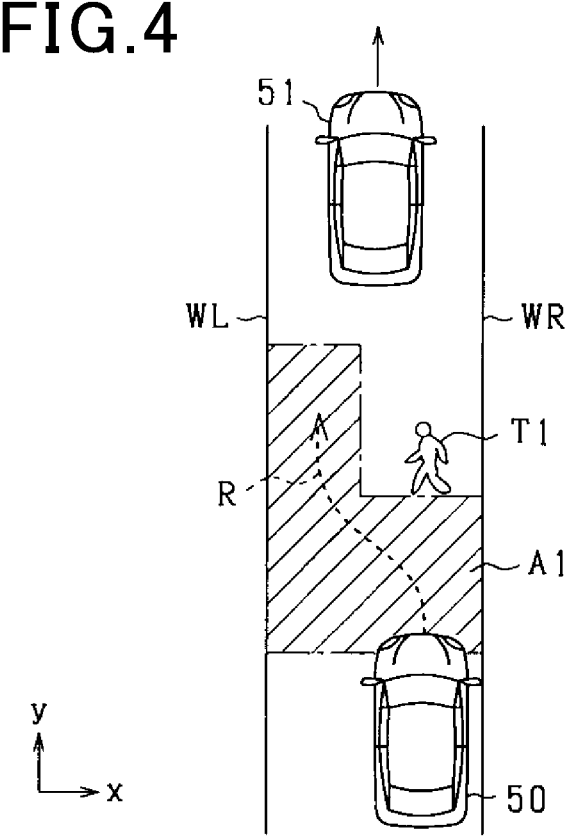
FIG. 4 is a diagram describing a secondary determination region.

As illustrated in FIG. 4, the secondary determination region setting unit 14 sets a secondary determination region A1 around the avoidance steering route R. The secondary determination region A1 may be set so as to include the entire avoidance steering route R and be wider than the avoidance steering route R. As illustrated in FIG. 4, if the primary target T1 exists between the own vehicle 50 and a preceding vehicle 51 and the avoidance steering route R is a route for steering to the left, the secondary determination region A1 is a substantially L-shaped region that includes the entire region between the primary target T1 and the own vehicle 50 in the driving lane with the left white line WL and the right white line WR at the ends and the region between the primary target T1 and the left white line WL.

As described above, an object having a high existence probability is selected as the primary target T1. Accordingly, an object with a low existence probability may be excluded from the primary target T1. Therefore, setting the secondary determination region A1 between the own vehicle 50 and the primary target T1 makes it possible to set an object excluded from the primary target T1 as a target on which it is determined whether to execute an avoidance control if the object exists between the own vehicle 50 and the primary target T1.

Figure 5:
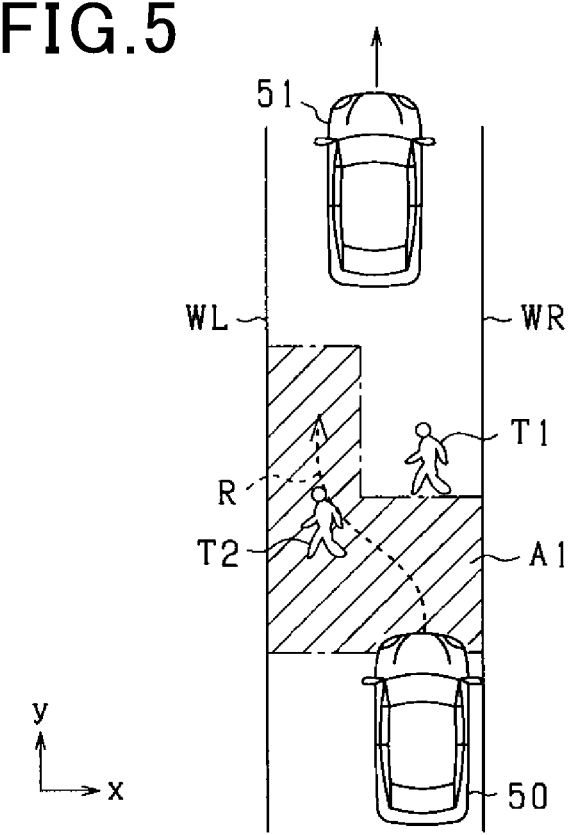
FIG. 5 is a diagram illustrating a state in which a secondary target exists in the secondary determination region.

The secondary target determination unit 15 determines an object to be a secondary target in the secondary determination region, based on the detection information acquired by the object recognition unit 11. More specifically, the secondary target determination unit 15 determines whether there exists in the secondary determination region an object to be a secondary target of which a collision with the own vehicle is to be avoided, based on the detection information acquired by the object recognition unit 11. For example, as illustrated in FIG. 5, if the own vehicle 50 travels on the avoidance steering route R, the own vehicle 50 will collide with a pedestrian (T2) present in the secondary determination region A1. This pedestrian is recognized as secondary target T2, and the secondary target determination unit 15 determines that the secondary target T2 exists.

The secondary target determination unit 15 may be configured to set the existence region where the secondary target exists based on the detection information. For example, the secondary target determination unit 15 may set margins around the secondary target and set an existence region including the margins. The secondary target determination unit 15 may be configured to determine that the secondary target exists if the existence region resides in the secondary determination region. Setting margins around the secondary target and determining whether an existence region including the margins is present in the secondary determination region makes it possible to avoid more reliably a collision between the secondary target and the own vehicle, regardless of the type of the secondary target and the detection accuracy.

If the primary avoidance determination unit 13 determines that the steering device 43 is to be activated for avoiding a collision with the primary target, the steering assistance unit 16 generates and outputs a control command to the steering device 43. If the primary target determination unit 12 determines that the primary target exists and the primary avoidance determination unit 13 determines that the steering device 43 is to be activated for avoiding a collision with the primary target, the steering assistance unit 16 generates a control command for executing avoidance steering and outputs the same to the steering device 43, on the condition that the secondary target determination unit 15 determines that there is no secondary target.

That is, even though the primary target determination unit 12 determines that the primary target T1 exists as illustrated in FIG. 2 and the primary avoidance determination unit 13 determines that the steering device 43 is to be activated for avoiding a collision with the primary target T1, the steering assistance unit 16 suppresses generation of a control command for executing avoidance steering of the own vehicle 50 if the secondary target determination unit 15 determines that the secondary target T2 exists as illustrated in FIG. 5. "Suppressing generation of a control command" may mean that no control command is generated or that generation of a control command is withheld. In addition, if the generation of a control command is withheld, the steering assistance unit 16 may further determine whether a predetermined condition is satisfied within a predetermined period of time, and then may determine whether to generate a control command based on the determination result. In another example, the steering control may be reduced such that avoidance steering is hardly executed.

If the primary avoidance determination unit 13 determines that the braking device 42 is to be activated for avoiding a collision with the primary target, the braking assistance unit 17 generates a control command for activating the braking device 42 and outputs the same to the braking device 42.

If the primary avoidance determination unit 13 determines that the warning device 41 is to be activated for warning of a collision with the primary target, the notification unit 18 generates a control command for activating the warning device 41 and outputs the same to the warning device 41.

Figure 6:
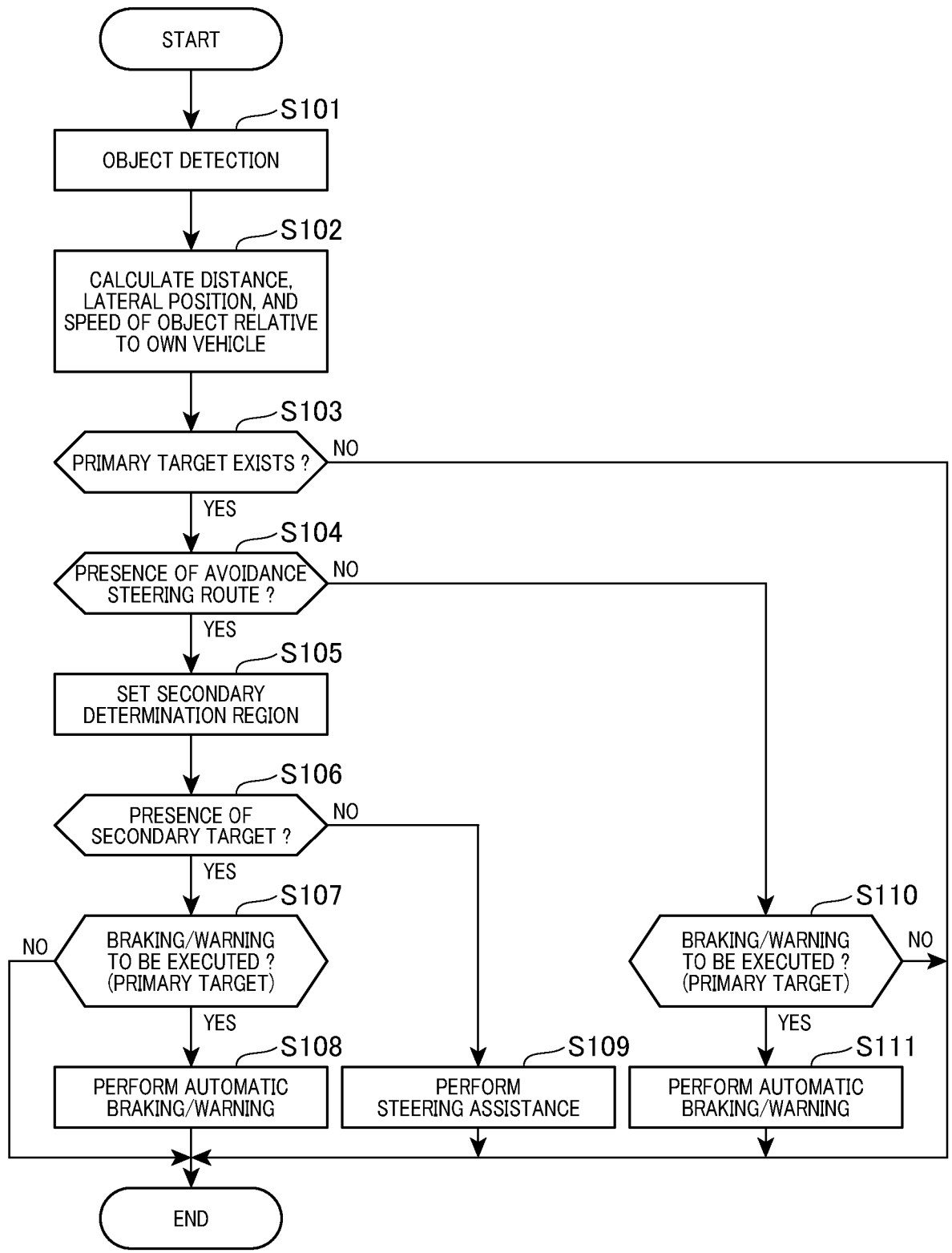
FIG. 6 is a flowchart of a driving assistance control according to the embodiment.

A driving assistance control executed by the ECU 10 will be described with reference to the flowchart illustrated in FIG. 6. The process illustrated in FIG. 6 is repeatedly executed.

First, in step S101, the ECU 10 acquires detection information on objects around the own vehicle by the camera sensor 21 and the radar sensor 22. Then, the process proceeds to step S102.

In step S102, the ECU 10 executes object recognition based on the object detection information acquired in step S101. Specifically, the ECU 10 calculates the distance between the own vehicle and an object, the lateral position of the object, and the speed of the object relative to the own vehicle. Then, the process proceeds to step S103.

In step S103, the ECU 10 determines whether, among the objects recognized in step S102, any object to be a primary target exists. If any object to be a target of collision avoidance on the current driving route of the own vehicle among the objects recognized in step S102, the ECU 10 recognizes the object as a primary target and determines that the primary target exists, and the process proceeds to step S104. For example, if the primary target as illustrated in FIG. 2 exists, the process proceeds to step S104. If there exists no object to be a target of collision avoidance on the current driving route of the own vehicle among the objects recognized in step S102, the ECU 10 determines that no primary target exists, and the process is ended.

Figure 7:
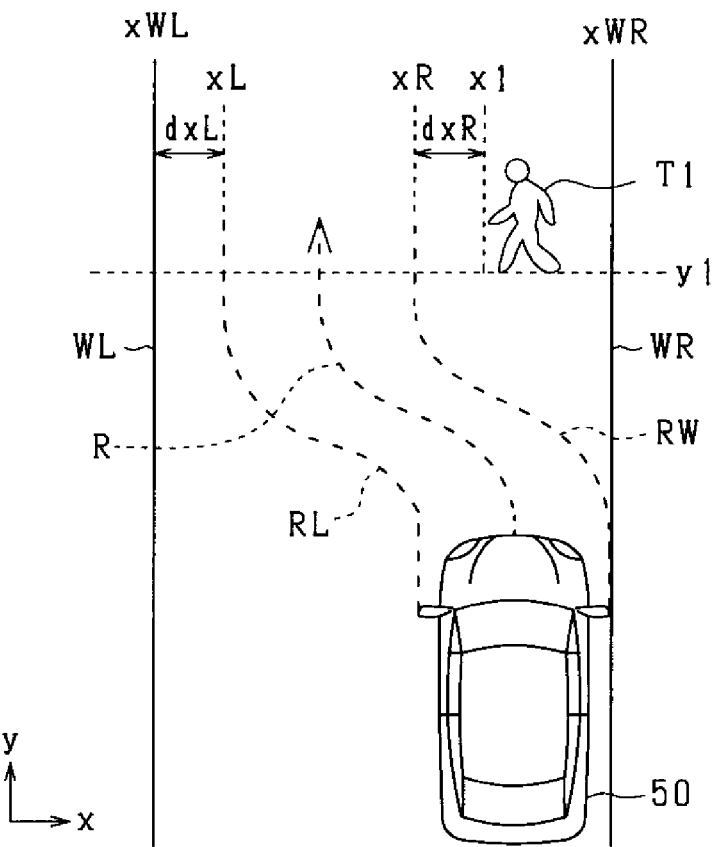
FIG. 7 is a diagram describing setting of an avoidance steering route R.

In step S104, the ECU 10 determines whether there exists an avoidance steering route of the own vehicle for avoiding a collision with the primary target. For example, if the avoidance steering route R as illustrated in FIG. 3 can be set, the ECU 10 determines that there exists an avoidance steering route. More specifically, if there exists a region between the left white line WL and the right white line WR enough space for the own vehicle 50 to travel while avoiding the primary target T1, the ECU 10 determines that the avoidance steering route R exists. For example, as illustrated in FIG. 7, if a predetermined lateral distance (distance in the x-axis direction) from the primary target T1 can be secured for the own vehicle 50 to pass by a position y1 of the primary target T1, the ECU 10 may determine that the avoidance steering route R exists. More specifically, referring to FIG. 7, the avoidance steering route R can be set with a route left edge RL and a route right edge RW. If a distance dxR can be secured at the position y1 between a left end position x1 of the primary target T1 and a position xR of the route right edge RW on the side closer to the primary target T1, the ECU 10 determines that the avoidance steering route R exists. Assuming that there is a distance dxL at the position y1 between a position xL of the route left edge RL on the side farther from the primary target T1 and a position xWL of the left white line WL on the side closer to the route left edge RL, the distance dxR is preferably securable to the same degree as the distance dxL. If the ECU 10 determines that there exists an avoidance steering route, the process proceeds to step S105. If the ECU 10 determines that there exists no avoidance steering route, the process proceeds to step S110. Steps S110 and S111 are intended not for avoidance steering but for avoiding or reducing a collision between the primary target and the own vehicle by braking or warning.

Figure 8:
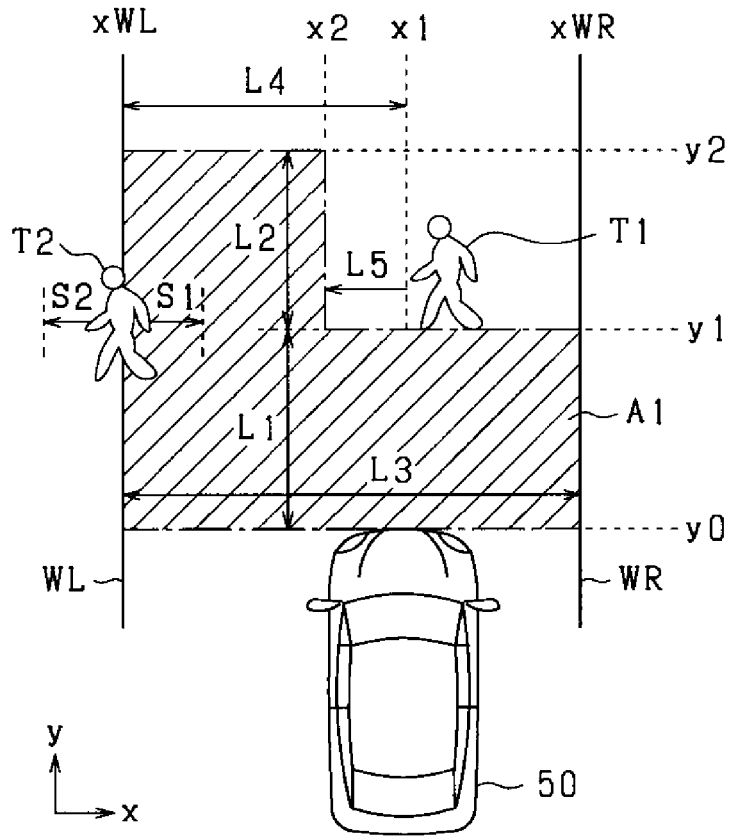
FIG. 8 is a diagram describing setting of the secondary determination region.

In step S105, the ECU 10 sets the secondary determination region based on the avoidance steering route. For example, in the case of avoiding the primary target T1 by steering the own vehicle 50 to the left as in the avoidance steering route R illustrated in FIG. 3, distances L1 to L5 are set as illustrated in FIG. 8. The distance L1 is a distance along the y axis between the own vehicle 50 and the primary target T1 (longitudinal distance). Specifically, the distance along the y axis from a position y0 of the front end of the own vehicle 50 to a position y1 of the rear end of the primary target T1 can be set as distance L1. The distance L2 is a longitudinal distance from the primary target T1 to the upper limit of the secondary determination region A1 along the depth. Specifically, the distance along the y axis from the position y1 of the rear end of the primary target T1 to the position y2 of the upper limit of the secondary determination region A1 along the depth can be set as distance L2. The distance L3 is a distance along the x axis between the left white line WL and the right white line WR (lateral distance). Specifically, the distance along the x axis between a position xWL of the left white line WL and a position xWR of the right white line WR can be set as distance L3. The x axis is orthogonal to the y axis, and the longitudinal distance and the lateral distance are distances orthogonal to each other. The distance L4 is a lateral distance between the white line (left white line WL) located on the left side viewed from the steering direction of the own vehicle 50 and the primary target T1. Specifically, for example, the distance along the x axis between the position xWL of the left white line WL and a position x1 of the left end of the primary target T1 can be set as distance L4. The distance L5 is a region offset, which is a lateral distance between the primary target T1 and the secondary determination region A1 on the left side viewed from the steering direction of the own vehicle 50. Specifically, for example, the distance along the x axis between the position x1 of the left end of the primary target T1 and a right end position x2 behind the position y1 of the secondary determination region A1 can be set as distance L5. The distances L1 to L5 can be set based on the distance between the own vehicle and the primary target calculated in step S102, the lateral position of the primary target, the speed of the primary target relative to the own vehicle, the positions of the white lines, and the like. Then, the process proceeds to step S106.

In step S106, the ECU 10 determines whether there exists a secondary target in the secondary determination region set in step S105. In step S106, as illustrated in FIG. 8, margins S1 and S2 are set on lateral sides of the secondary target T2 (along the x axis). The margin S1 is a left margin along the steering direction of the own vehicle 50, and the margin S2 is a right margin opposite to the steering direction of the own vehicle 50. The region where the secondary target T2 is detected and the region including the margins S1 and S2 are recognized as existence region of the secondary target T2. If the recognized existence region of the secondary target T2 partially or entirely exists in the secondary determination region A1, the ECU 10 determines that there exists the secondary target in the secondary determination region.

Figure 9:
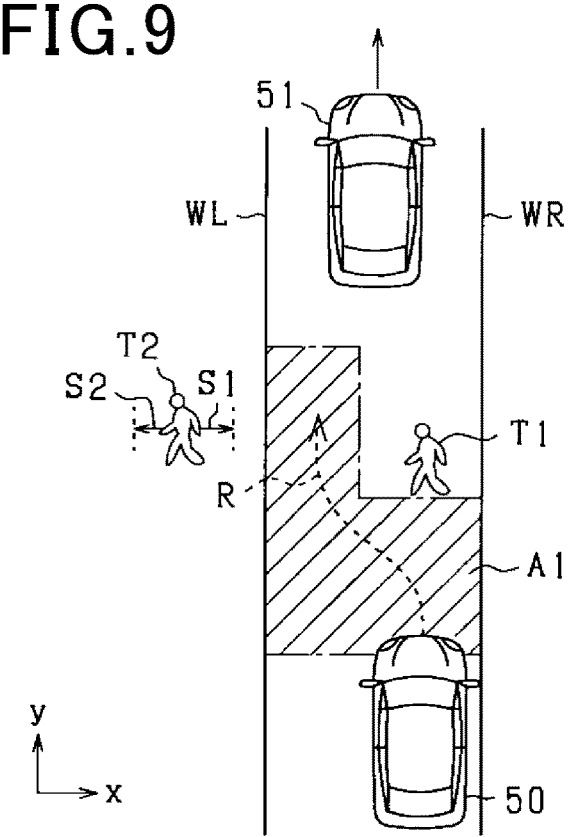
FIG. 9 is a diagram describing determination of the secondary target in the secondary determination region.

As illustrated in FIG. 9, if the right end of the margin S1 of the secondary target T2 is located on the left of the left white line WL, the ECU 10 determines that the existence region of the secondary target T2 including the margins S1 and S2 does not exist within the secondary determination region A1. As a result, the ECU 10 makes a negative determination in step S106, and the process proceeds to step S109. In step S109, the ECU 10 provides steering assistance. Specifically, the ECU 10 outputs a control signal for executing avoidance steering to the steering device 43 according to the avoidance steering route set in step S104. After that, the process is ended.

Figure 10:
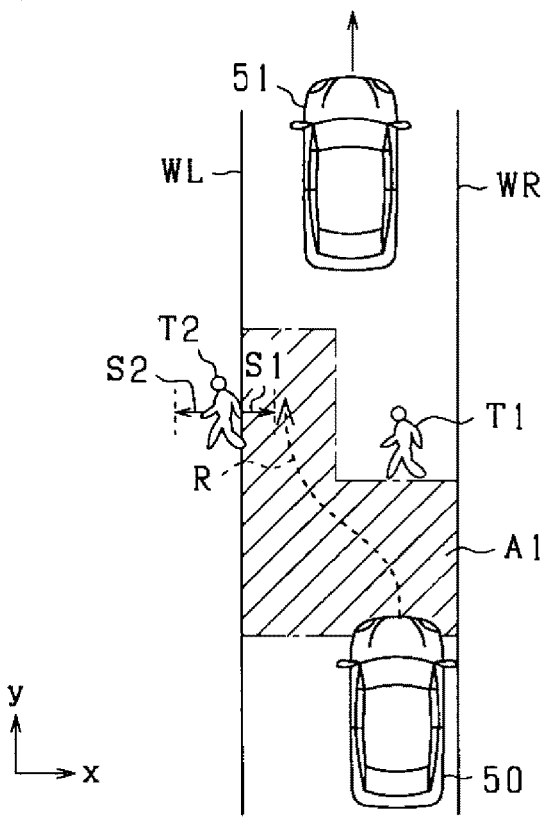
FIG. 10 is a diagram describing determination of the secondary target in the secondary determination region.

As illustrated in FIG. 10, if the right end of the margin S1 of the secondary target T2 is located on the right of the left white line WL, the ECU 10 determines that the existence region of the secondary target T2 including the margins S1 and S2 exists within the secondary determination region A1. As a result, the ECU 10 makes an affirmative determination in step S106, and the process proceeds to step S107.

Steps S107 and S108 are steps for avoiding or mitigating a collision between the primary target and the own vehicle by braking or warning instead of avoidance steering. In step S107, the ECU 10 determines whether to perform automatic braking against the primary target or make a notification by issuing a warning about the primary target. Specifically, the ECU 10 determines whether to activate the warning device 41 and the braking device 42 for avoiding a collision, from a comparison between the time to collision and the activation timing. If the ECU 10 makes an affirmative determination in step S107, the ECU 10 issues a warning command to the warning device 41 and an automatic braking command to the braking device 42 in step S108, and then the process is ended. If the ECU 10 makes a negative determination in step S107, the process is ended accordingly. Steps S110 and S111 are similar to steps S107 and S108, and thus description of these steps will be omitted.

As described above, according to the first embodiment, if the ECU 10 determines that there exists a primary target of which a collision with the own vehicle is to be avoided as in step S103, and if the ECU 10 determines that there exists an avoidance steering route for avoiding a collision with the primary target as in step S104, the ECU 10 sets the secondary determination region based on the avoidance steering route as in step S105. If the ECU 10 determines that there exists no secondary target within the secondary determination region as in steps S106 and S109, the ECU 10 provides steering assistance along the avoidance steering route. If the ECU 10 determines that there exists the secondary target in the secondary determination region as in steps S106 to S108, the ECU 10 does not provide steering assistance but executes a collision avoidance process by automatic braking and warning. According to the first embodiment, even though it is determined that the primary target exists, if it is determined that the secondary target exists, the ECU 10 does not execute avoidance steering of the own vehicle for avoiding a collision with the primary target. This makes it possible to suppress an increase in the possibility of a collision with an object that is different from the primary target and exists on the avoidance steering route that could be caused by avoiding a collision with the primary target by automatic steering. If avoidance steering is not executed, a collision with the primary target can be avoided by a means other than automatic steering.

MODIFICATION EXAMPLES

The secondary determination region setting unit 14 may be configured to change the size and setting position of the secondary determination region, based on the type, speed, size, position, and the like of the secondary target. Similarly, the secondary target determination unit 15 may be configured to change the margins of the secondary target to change the existence region, based on the type, speed, size, position, and the like of the secondary target. The type, speed, and size of the secondary target can be acquired by the object recognition unit 11 as detection information from the object detection device 20.

Figure 11:
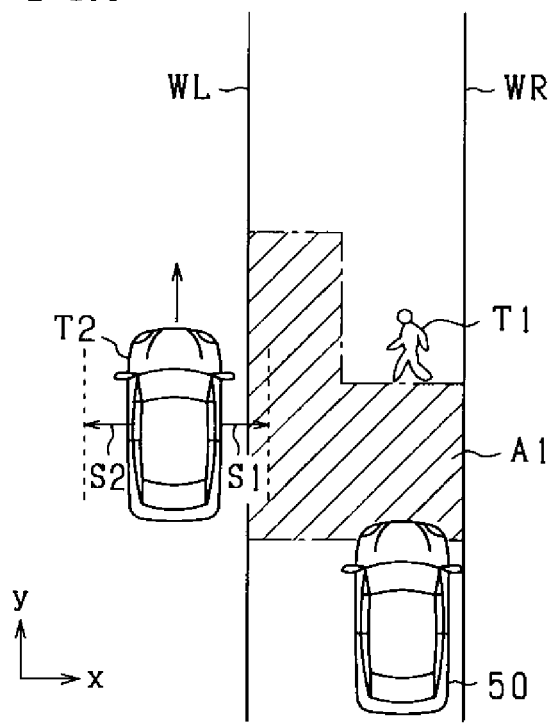
FIG. 11 is a diagram describing a secondary determination region and margins in a case where a secondary target according to a modification example is a preceding vehicle.
Figure 12:
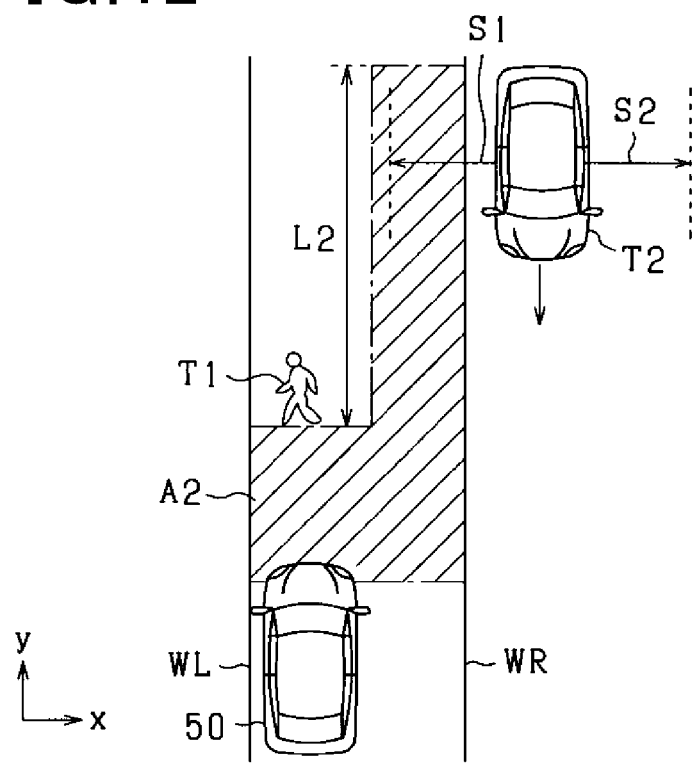
FIG. 12 is a diagram describing a secondary determination region and margins in a case where a secondary target according to a modification example is an oncoming vehicle.

FIGS. 11 to 14 illustrate secondary determination regions and margins of secondary targets that are preceding vehicle, oncoming vehicle, pedestrian, and stationary object, respectively. The oncoming vehicle is a vehicle that driving in the direction opposite to the traveling direction of the own vehicle. If the secondary target T2 is an oncoming vehicle as illustrated in FIG. 12, the distance L2 may be made longer than in the case where the secondary target T2 is a preceding vehicle as illustrated in FIG. 11, thereby to set the margins S1 and S2 to be large. Specifically, in the case of the preceding vehicle illustrated in FIG. 11, for example, the distance L2 may be 10 m and the margins S1 and S2 may be each 1 m, whereas in the case of the oncoming vehicle illustrated in FIG. 12, the distance L2 may be 100 m and the margins S1 and S2 may be each 4.5 m. If the secondary target T2 is an oncoming vehicle, there is a higher risk of a collision between the secondary target T2 and the own vehicle 50 than in the case where the secondary target T2 is a preceding vehicle. Therefore, if the secondary target T2 is an oncoming vehicle, the secondary determination region A2 is set with the distance L2 longer than that in the case where the secondary target T2 is a preceding vehicle. The margins S1 and S2 are set larger to increase the existence region. Accordingly, the ECU 10 is likely to make an affirmative determination in step S106 so that it is possible to more reliably avoid a collision between the secondary target T2 and the own vehicle 50.

Figure 13:
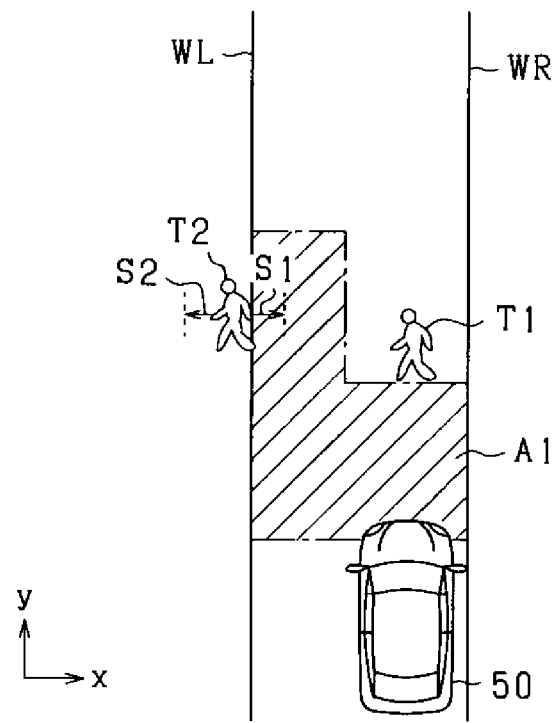
FIG. 13 is a diagram describing a secondary determination region and margins in a case where a secondary target according to a modification example is a pedestrian.
Figure 14:
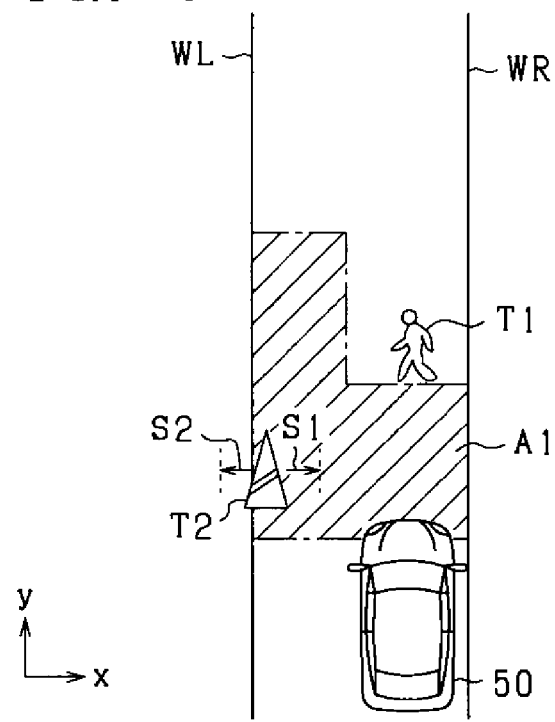
FIG. 14 is a diagram describing a secondary determination region and margins in a case where a secondary target according to a modification example is a stationary object.

If the secondary target T2 is an on-road structure such as a road cone as illustrated in FIG. 14 and is ranked in a low place as a target of collision avoidance, the margins S1 and S2 may be set larger than in the case where the secondary target T2 is an object that is ranked in a high place as a target of collision avoidance such as a pedestrian as illustrated in FIG. 13. Specifically, in the case of the pedestrian illustrated in FIG. 13, for example, the margins S1 and S2 may each be set to 1 m, whereas in the case of the on-road structure illustrated in FIG. 14, the margins S1 and S2 may each be set to 1.3 m. The distances L2 illustrated in FIGS. 13 and 14 are both set to 10 m.

In the driving assistance device, if the existence probability is set by object type, the size of an object with a low existence probability may not be detected. For example, as for an object determined to have a high existence probability such as a pedestrian, the dimension of the object such as lateral width (the dimension along the x axis) is detected, whereas as for an object determined as to have a low existence probability such as an on-road structure, the object may be detected as a point and the dimension of the object such as lateral width may not be detected. Even if the lateral width of the secondary target T2 with a low existence probability such as an on-road structure is not detected, it is possible to avoid a collision with the own vehicle 50 more reliably by increasing the margins S1 and S2 of the secondary target T2 with a low existence probability to be larger than those of the secondary target T2 with a high existence probability such as a pedestrian.

Figure 15:
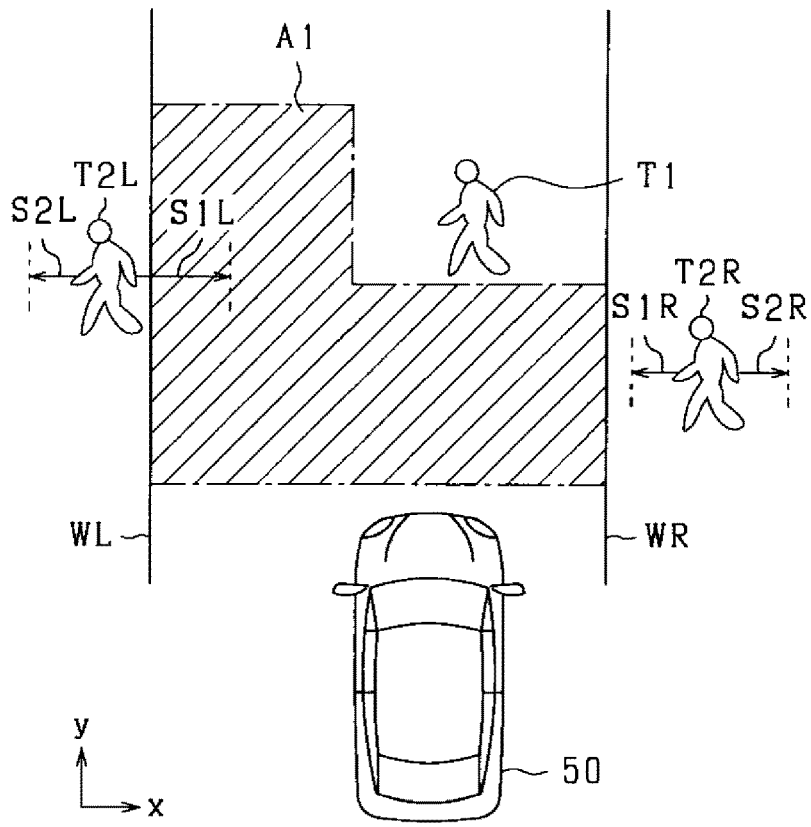
FIG. 15 is a diagram describing a positional relationship between secondary targets and a secondary determination region according to a modification example.

As illustrated in FIG. 15, as for a secondary target T2L existing on the left side viewed from the avoidance steering direction of the own vehicle 50 and a secondary target T2R existing on the right side viewed from the direction opposite to the avoidance steering direction, margins S1L, S2L, S1R, and S2R may be changed in size. For example, the secondary target T2L existing in the avoidance steering direction has a higher risk of a collision with the own vehicle 50 than the secondary target T2R existing on the side opposite to the avoidance steering direction, the margins S1L and S2L may be set larger than the margins S1R and S2R. The margins S2L and S2R set on the side opposite to the secondary determination region A1 may be set smaller than the margins S1L and S1R on the side facing the secondary determination region A1 or may be set to zero.

Figure 16:
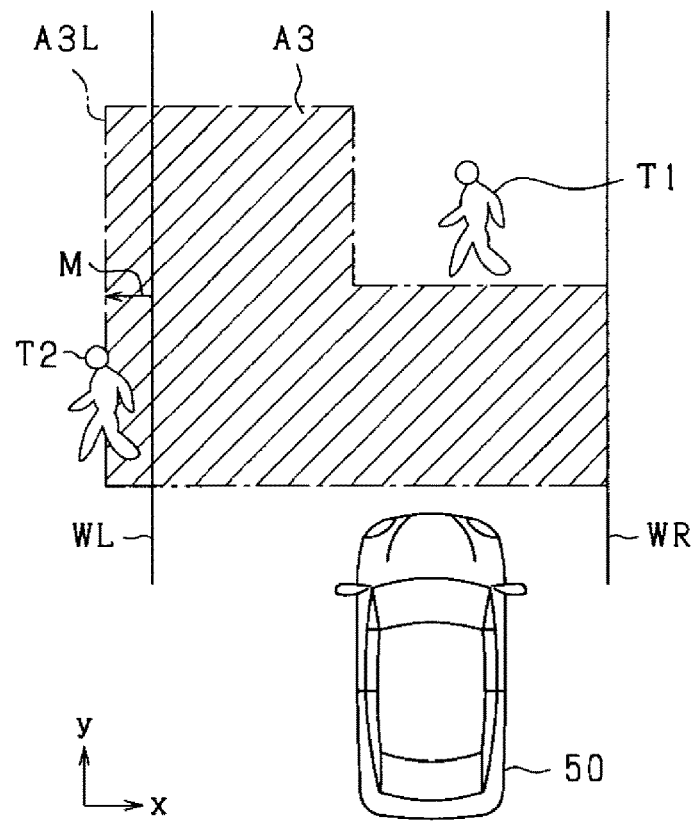
FIG. 16 is a diagram describing setting of a secondary determination region according to a modification example.

Instead of changing the sizes of the margins described with reference to FIGS. 11 to 15, the lateral dimension and position of the secondary determination region may be changed as illustrated in FIG. 16. A secondary determination region A3 includes a region A3L that extends beyond the left white line WL by a lateral length M corresponding to the margin set to the secondary target T2. For example, setting the lateral length M to the same value as the margin S1L illustrated in FIG. 15 allows the existence of the secondary target to be easily determined to the same degree as illustrated in FIG. 15, without the need to set the margin for the secondary target T2.

The secondary determination region setting unit 14 may be configured to set the region offset L5 based on the type of the primary target T1, or may be configured to set the region offset L5 based on the detection accuracy of objects around the own vehicle 50, or may be configured to set the region offset L5 based on a region where the primary target T1 may exist after a lapse of a time to collision TTC. For example, depending on the detection accuracy of objects, it may be detected that a plurality of objects exists for one primary target T1. In this case, an object detected at a shorter lateral distance from the primary target T1 than the region offset L5 can be treated as identical to the primary target T1 to compensate for the detection accuracy of objects, whereby it is possible to set the secondary determination region in a more appropriate manner.

According to the above-described embodiments, the following advantageous effects can be achieved.

The ECU 10 functions as a driving assistance device that provides driving assistance for avoiding a collision between the own vehicle and an object, based on the detection information on objects around the own vehicle. The ECU 10 includes the secondary determination region setting unit 14, the secondary target determination unit 15, and the steering assistance unit 16. The primary target determination unit 12 determines an object to be the primary target of which a collision with the own vehicle is to be avoided, based on the detection information. The secondary determination region setting unit 14 sets the secondary determination region in which to determine an object to be the secondary target of which a collision with the own vehicle is to be avoided, on the avoidance steering route of the own vehicle for avoiding a collision with the primary target, based on the detection information. The secondary target determination unit 15 determines an object to be the secondary target in the secondary determination region, based on the detection information. The steering assistance unit 16 has the function of providing steering assistance to the own vehicle. If the primary target determination unit 12 determines that the primary target exists and the secondary target determination unit 15 determines that the secondary target exists, the steering assistance unit 16 suppresses the avoidance steering of the own vehicle. That is, even though the primary target determination unit 12 determines that the primary target exists, if the secondary target determination unit 15 determines that the secondary target exists, the steering assistance unit 16 suppresses the avoidance steering of the own vehicle for avoiding a collision with the primary target. This makes it possible to suppress an increase in the possibility of a collision with an object that is different from the primary target and exists on the avoidance steering route, which could be caused by the avoidance of a collision with the primary target through automatic steering by the steering assistance unit 16.

The secondary determination region setting unit 14 may be configured to change the secondary determination region based on the type, speed, size, or position of the secondary target acquired as the detection information. This makes it possible to appropriately change the size and setting position of the secondary determination region in response to a change in the risk of a collision between the secondary target and the own vehicle according to the type, speed, size, or position of the secondary target. Accordingly, the possibility of a collision between the secondary target and the own vehicle can be determined more properly to provide appropriate driving assistance.

The secondary target determination unit 15 may be configured to set the existence region where the secondary targe exists, based on the detection information. Further, the secondary target determination unit 15 may be configured to, if the existence region is located in the secondary determination region, determine that the secondary target exists. Setting margins around the secondary target and determining whether the existence region including the margins is located in the secondary determination region makes it possible to avoid a collision between the secondary target and the own vehicle in a more reliable manner, regardless of the type and detection accuracy of the secondary target.

The secondary target determination unit 15 may be configured to change the existence region based on the type, speed, size, or position of the secondary target acquired as the detection information. This makes it possible to appropriately change the size and setting position of the existence region of the secondary target in response to a change in the risk of a collision between the secondary target and the own vehicle according to the type, speed, size, or position of the secondary target. Accordingly, the possibility of a collision between the secondary target and the own vehicle can be determined more properly to provide appropriate driving assistance. Specifically, the secondary target determination unit 15 may be configured to, if the type of the secondary target is a vehicle driving in the direction opposite to the traveling direction of the own vehicle (oncoming vehicle), for example, set the existence region to be larger than in the case where the type of the secondary target is a vehicle driving in the same direction as the traveling direction of the own vehicle (for example, a preceding vehicle).

In the above-described embodiments, the steering assistance unit 16 is configured to suppress avoidance steering if it is determined that the secondary target exists in the secondary determination region, as the determination on avoidance steering. In another embodiment, instead of the foregoing configuration, a steering assistance unit 16 may be configured to suppress avoidance steering of the own vehicle if an oncoming vehicle driving in the opposite lane is detected in the direction of avoidance steering (ahead in the steering direction). If an oncoming vehicle exists in the direction of avoidance steering, as the own vehicle and the oncoming vehicle approach each other, collision avoidance may be unnecessarily activated by braking for the oncoming vehicle. However, this configuration can avoid such a situation.

In the above-described embodiments, the distance along the y axis from the position y1 of the rear end of the primary target T1 to the position y2 of the upper limit of the secondary determination region A1 along the depth is set as the distance L2. As another embodiment, the distance L2 may be set in accordance with the speed of the own vehicle. For example, setting the distance L2 to be longer with an increase in the speed of the own vehicle makes it possible to set an appropriate determination region in accordance with the speed of the own vehicle.

In the above-described embodiments, the margins S1 and S2 are set for the existence region of the secondary target. The margins S1 and S2 may be changed in accordance with the traveling direction of the secondary target. Specifically, the margin along the traveling direction of the secondary target may be changed so as to be larger than the margin along the direction opposite to the traveling direction. The margins S1 and S2 may be changed themselves or may be changed as a whole by adding a correction margin to the margins S1 and S2. In addition, the margins may be changed in accordance with the speed of traveling.

The margins S1 and S2 may be changed in accordance with the distance between the own vehicle and the secondary target. Specifically, the margins S1 and S2 may be set smaller if the secondary target is close to the own vehicle, and may be set larger if the secondary target is distant from the own vehicle. The margins S1 and S2 may be set larger if the secondary target exists at the rear of a point where it is predicted that the own vehicle will start avoidance steering, and may be set smaller if the secondary target exists in front of the point where it is predicted that the own vehicle will start avoidance steering. Setting the margins in this manner suppresses unnecessary stoppage of execution of avoidance steering due to the secondary target existing before the start of avoidance steering. If margins are set for the own vehicle in the lateral direction and the longitudinal direction, the margins S1 and S2 may be changed only in the lateral direction.

Figure 17:
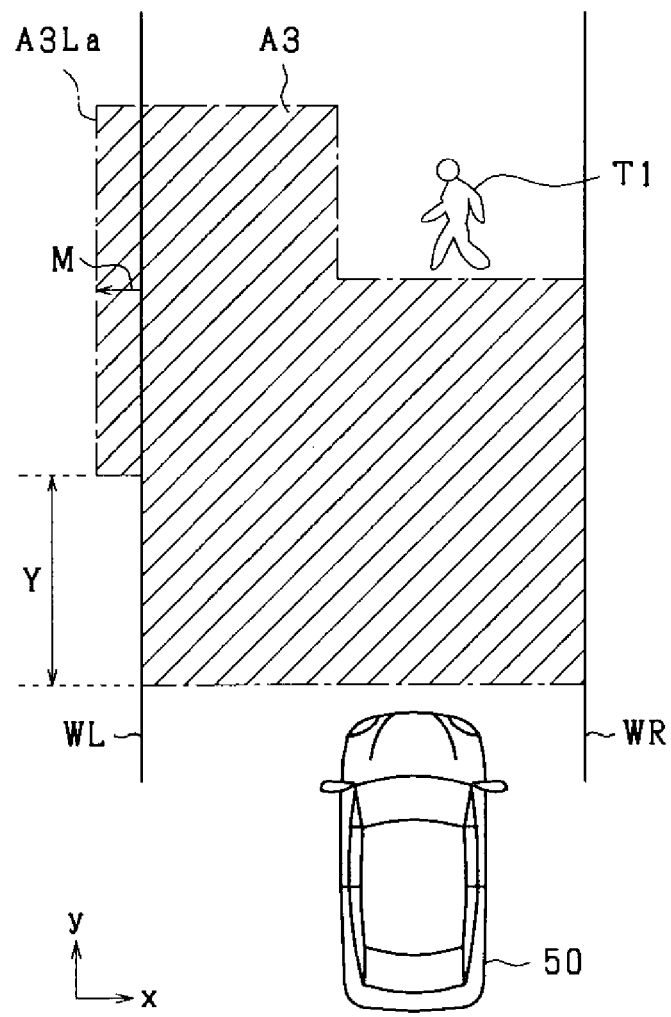
FIG. 17 is a diagram describing setting of a secondary determination region according to a modification example.

In the above-described embodiments, as illustrated in FIG. 16, instead of setting margins to the secondary target T2, the region A3L with the lateral length M extending beyond the left white line WL may be added to the secondary determination region A3. However, the present invention is not limited to this. Both addition of the region A3L and setting of margins may be performed to the secondary target T2. Besides the region A3L illustrated in FIG. 16, a region A3La extending beyond the left white line WL may be set as illustrated in FIG. 17. The region A3La extending beyond the left white line WL is set bypassing a section of a distance Y where the own vehicle 50 will travel from the current position until starting to curve by steering. In the section where the own vehicle 50 will travel, there is an extremely low possibility of a collision with the secondary target existing on the left white line WL. Thus, setting a region beyond the left white line WL in this section will suppress avoidance steering against the primary target T1 more than necessary. Excluding a region beyond the left white line WL in the section where the own vehicle 50 will travel as in the region A3La suppresses avoidance steering against the primary target T1 from being stopped more than necessary.

The control unit and its operations described in the present disclosure may be implemented by a dedicated computer that is provided by forming a processor programmed to execute one or more functions embodied by a computer program and a memory. Alternatively, the control unit and its operations described in the present disclosure may be implemented by a dedicated computer that is provided by forming a processor from one or more dedicated hardware logic circuits. Otherwise, the control unit and its operations described in the present disclosure may be implemented by one or more dedicated computers that are formed by a combination of a processor programmed to execute one or more functions and a memory and a processor formed by one or more hardware logical circuits. The computer program may be stored as instructions to be executed by the computer, in a computer-readable non-transitory tangible recording medium.

The present disclosure has been described in accordance with the embodiments, but it should be understood that the present disclosure is not limited to these embodiments and structures. The present disclosure also includes various modification examples and modifications within the scope of equivalence. In addition, various combinations and modes, and other combinations and modes including only one element of the foregoing combinations and modes, less or more than the one element, are included in the scope and conceptual range of the present disclosure.

What is claimed is:

1. A driving assistance device that provides driving assistance for avoiding a collision between an own vehicle and an object around the own vehicle, based on detection information corresponding to the object, the driving assistance device comprising a processor and a memory storing a program, the processor executes the program to cause performance of operations comprising:
    determining, based on the detection information, an object to be a primary target of which a collision with the own vehicle is to be avoided; the primary target being an object in which:
        an existence probability of the object is determined to be high,
        the object exists on a traveling route of the own vehicle, and
        a time to collision of the object with the own vehicle is lower than a minimum set value,
    setting, based on the detection information, a secondary determination region in which to determine an object to be a secondary target of which a collision with the own vehicle is to be avoided on an avoidance steering route of the own vehicle for avoiding a collision with the primary target;
    determining, based on the detection information, an object to be the secondary target in the secondary determination region even if an existence probability of the object is determined to be low; and
    providing steering assistance to the own vehicle, wherein:
        avoidance steering of the own vehicle is suppressed if it is determined that the primary target exists and it is determined that the secondary target exists,
        the operations further include setting margins around the secondary target and setting an existence region where the secondary target exists including the margins, based on the detection information,
        the operations further include changing the size of at least one margin to make the existence region larger based on at least one of the type, speed, size, or position of the secondary target acquired as the detection information, and
        if the existence region is within the secondary determination region, it is determined that the secondary target exists.

2. The driving assistance device according to claim 1, wherein the operations further include changing the secondary determination region, based on type, speed, size, or position of the secondary target acquired as the detection information.

3. The driving assistance device according to claim 1, wherein the operations further include, if the type of the secondary target is an oncoming vehicle that is a vehicle driving in a direction opposite to a traveling direction of the own vehicle, setting the existence region to be larger than in a case where the type of the secondary target is a vehicle driving in the same direction as the traveling direction of the own vehicle.

4. A driving assistance device that provides driving assistance for avoiding a collision between an own vehicle and an object around the own vehicle, based on detection information on the object, the driving assistance device comprising a processor and a memory storing a program, the processor executes the program to cause performance of operations comprising:
    determining, based on the detection information, an object to be a primary target of which a collision with the own vehicle is to be avoided;
    setting, based on the detection information, a secondary determination region in which to determine an object to be a secondary target of which a collision with the own vehicle is to be avoided on an avoidance steering route of the own vehicle for avoiding a collision with the primary target;
    determining, based on the detection information, an object to be the secondary target in the secondary determination region; and
    providing steering assistance to the own vehicle, wherein:
        avoidance steering of the own vehicle is suppressed if it is determined that the primary target exists and it is determined that the secondary target exists,
        the operations further include setting margins around the secondary target and setting an existence region where the secondary target exists including the margins, based on the detection information, the margins being set larger in a case in which the secondary target exists farther away than a point where it is predicted that the own vehicle will start avoidance steering, than in a case in which the secondary target exists nearer than the point,
        the operations further include changing the size of at least one margin based on at least one of the type, speed, size, or position of the secondary target acquired as the detection information, and
        if the existence region is within the secondary determination region, it is determined that the secondary target exists.

\* \* \* \* \*